UNITED STATES PATENT OFFICE 2,107,508

SULPHONATED HYDROGENATED ABIETYL DERIVATIVES AND METHOD OF PRODUCING

Alfred L. Rummelsburg, Wilmington, Del., assignor to Hercules Powder Company, Wilmington, Del., a corporation of Delaware No Drawing. Application March 16, 1934, Serial No. 715,941

19 Claims. (Cl. 260—99.12)

This invention relates to sulphonated hydrogenated abietyl derivatives and methods for their production.

In accordance with this invention it has been found possible to sulphonate various hydrogenated abietyl derivatives, such as dihydroabietyl alcohol, tetrahydroabietyl alcohol, etc., or mixtures thereof, and the corresponding halides or their mixtures, by treating, for example, the alcohols with any of the known sulphonating agents, such as sulphuric acid, sulphur trioxide, chlorsulphonic acid, acetyl sulphuric acid, etc., or by treating, for example, the halides with a sulphite, as sodium sulphite, sodium acid sulphite, etc.

By the term "hydrogenated abietyl alcohol" is meant a primary alcohol, $C_{19}H_{31}CH_2OH$ (dihydroabietyl alcohol) or $C_{19}H_{33}CH_2OH$ (tetrahydroabietyl alcohol), related to abietic acid, $C_{19}H_{29}COOH$, or a mixture of these two alcohols. The hydrogenated abietyl derivatives referred to in the specification and claims as suitable for sulphonation may accordingly be represented as $C_{19}H_{31}CH_2X$, $C_{19}H_{33}CH_2X$, or mixtures thereof, where X is OH, Cl, Br, $NH_2$, or other functional group replaceable in sulphonation by the sulphate or sulphonate group.

Dihydro- and tetrahydroabietyl alcohols may be obtained by catalytic hydrogenation of alkyl abietates, or alkyl esters of rosin, crude or refined, or the corresponding hydrogenated esters, all as is more fully disclosed in the application for United States patent Serial No. 604,859, filed April 12, 1932, by Irvin W. Humphrey, or by means of the action of sodium upon an alcohol solution of hydrogenated methyl or ethyl abietate according to the method described by Ruzicka and Meyer, Helv. Chim. Acta 5, 581–93 (1922) for the unhydrogenated abietates. The corresponding halides, as, for example, dihydroabietyl chloride and bromide, tetrahydroabietyl chloride and bromide, etc. may be produced by treating the alcohol with the desired hydrogen halide, as hydrogen chloride, hydrogen bromide, etc., or with phosphorus tri- or pentachloride, phosphorus tribromide, etc.

Thus, hydrogenated abietyl alcohol may be produced from hydrogenated methyl abietate in the following manner:

120 g. hydrogenated methyl abietate are placed in a pressure bomb equipped with electric heating, hydrogen inlet, agitator, and pyrometric secondary devices, 4 g. copper-chromium oxide catalyst are added and $H_2$ gas allowed to enter and leave several times in order to flush out oxygen. The bomb is then filled with hydrogen to a pressure of about 1720 lbs. sq. in. Electric heating and agitation is started and about 3 hours is required for the bomb to reach its maximum temperature of 275° C. as follows:

*Typical run*

| Time | Temp. | Pressure pounds |
|---|---|---|
| *Hours* | *° C.* | |
| 0 | 25 | 1720 |
| 1 | 175 | 2600 |
| ½ | 250 | 2920 |
| ½ | 270 | 2570 |
| ½ | 276 | 2390 |
| ½ | 276 | 2300 |
| ½ | 272 | 2280 |
| 1 | 275 | 2280 |
| 1 | 276 | 2210 |
| 2½ | 276 | 2240 |

Agitation and heating is stopped and the system allowed to cool to 25° C. The pressure is then #1000. The gas is bled off, and the product extracted with ether, filtered from catalyst, and the ether then evaporated. The product contains 89% hydrogenated abietyl alcohol.

The copper-chromium oxide catalyst is desirably prepared according to the method described by Connor, Folkers and Adkins, J. A. C. S. Vol. 54, pages 1139–40.

Pressure of reduction of the abietyl compound to the alcohol may range from about 50 to 2000 atmospheres, and temperature from about 175 to 350° C.

The hydrogenated abietyl alcohol may be purified, if desired, by means of fractional distillation at reduced pressure, distilling off a preliminary cut of say 5–15% which may be low in hydrogenated abietyl alcohol, depending upon the conditions of hydrogenation and source of raw material.

The main portion of the hydrogenated abietyl alcohol may be distilled under reduced pressure, if desired, to improve its color and remove traces of catalyst, if such be present. During the distillation several cuts of the distillate may be made.

The raw material for conversion may, in place of hydrogenated methyl abietate, be rosin, rosin esters as methyl abietate, ethyl abietate, butyl abietate, propyl abietate, etc., abietic acid, abietic acid esters or other abietyl compounds containing a group reducible to the primary alcohol group, $CH_2OH$. The raw material may be hydrogenated to its dihydro or tetrahydro abietyl compound, or a mixture of the two, prior to reduction to hydrogenated abietyl alcohol. In event the unsaturated bonds in the raw materials are not partially hydrogenated in a separate operation, prior to the reduction of the carboxyl group to the alcohol group, the latter procedure normally results in a partial saturation of the unsaturated bonds of the abietyl compound with hydrogen. Thus, methyl abietate will yield dihydro abietyl alcohol.

If desired, the abietyl compound may be isomerized prior to its conversion to hydrogenated abietyl alcohol by means of heat treatment at temperatures of about 250–325° or by heating with dilute acids at lower temperatures.

Either gum rosin or wood rosin may be employed for conversion to hydrogenated abietyl alcohol. Other resin acids of similar structure may be employed, or their esters, in order to synthesize various resin alcohols. If desired, the rosin prior to conversion may be partially distilled under reduced pressure separating a cut of say 5-15%; this procedure will increase the abietic acid content of the residue which accordingly will yield a hydrogenated abietyl alcohol of higher purity than the original rosin.

If desired the wood or gum rosin may be refined prior to conversion, as by distillation under reduced pressure according to known procedures, the distillate or one of its cuts being used as the source of hydrogenated abietyl alcohol. The rosin may also be given a prior refining by crystallization from a suitable solvent or by washing in solution, as gasoline, with a substantially immiscible color body solvent as furfural or phenol for the removal of color bodies and other impurities. It is to be realized that the crude products of the above reactions, comprising mixtures of the various hydrogenated abietyl alcohols, may be sulphonated in accordance with this invention without substantial purification. For example, a technical grade of hydrogenated abietyl alcohol comprising alcohols of varying degrees of hydrogenation as above described of alkyl abietates may be treated in accordance with this invention without further purification. Such technical grades may have a total abietyl alcohol content of about 50%, but desirably for treatment in accordance with this invention will contain from 80-95% abietyl alcohols. The non-alcohol content is probably a $C_{19}$ cyclic hydrocarbon.

The products in accordance with this invention will comprise, depending upon the particular hydrogenated abietyl derivative and sulphonating agent employed, various hydroabietyl sulphonates and/or sulphates and mixtures thereof. The distinction between the sulphonates and the sulphates is purely technical. In the sulphates the linkage to carbon is through an oxygen atom, while in the sulphonates the linkage to carbon is directly through the sulphur atom. The process in accordance with this invention, especially where only partially saturated abietyl derivatives are employed, may produce mixed sulphonates and sulphates since there are several reactive points in the abietyl radical besides the position occupied by the functional group, and accordingly several different reactions with the sulphonating agent may take place. However, since all these sulphates, sulphonates, and mixtures thereof are substantially equivalent in the various uses made of them, they will be referred to hereinafter and in the claims as sulphonation products, which term is meant to include both sulphonates, sulphates and mixtures thereof.

The sulphonated hydrogenated abietyl derivatives produced in accordance with this invention are brownish-colored solids containing from 2 to 16% combined sulphur and are highly useful as dispersive, emulsifying, and wetting-out agents. Their alkali salts, as for example, the sodium, potassium, or ammonium salts of these sulphonation products, are soluble in water; while their salts with organic bases, as for example, pyridine, quinoline, triethanolamine, etc., are soluble in petroleum and aromatic hydrocarbons.

The method in accordance with this invention requires no special form of apparatus and includes broadly the treatment in any suitable manner of hydrogenated abietyl derivative with a sulphonating agent. Thus, for example, the hydrogenated abietyl derivative, as an abietyl alcohol, may be slowly added to the sulphonating agent, as for example, concentrated sulphuric acid, with vigorous agitation. The ratio of alcohol to acid may be widely varied, for example, from 1:0.3 to 1:50 parts by weight, and the reaction temperature may be varied within wide limits, for example, from about −20° C. to about 200° C., although a temperature of from about 10° C. to about 40° C. is preferred. The agitation will be continued after the addition of all the alcohol until a test portion of the mixture is completely soluble when dropped into water—about 6 to 20 hours at room temperature. The mixture is then diluted with water while cooled and agitated to give an acid concentration of 30 to 70%. The free sulphonation product will separate as the upper layer on standing and is purified by being dissolved in water, neutralized, salted out with, for example, a saturated solution of sodium chloride or sulphate, and dried.

If desired the sulphonating agent, as, for example, fuming sulphuric acid, may be added to the hydrogenated abietyl derivative, for example, a hydrogenated abietyl alcohol, dissolved in a suitable non-reactive solvent, such as ether, petroleum ether, hexane, etc., or in a solvent such as acetic anhydride, glacial acetic acid, etc., which combines with the sulphuric acid to form acetylsulphuric acid, a sulphonating agent. The acid will be added in excess, usually in considerable excess, and upon completion of the reaction the product may be obtained by washing the solvent and excess acid away with a saturated salt solution if a water-soluble solvent, e. g. acetic acid, is used, or by simple removal from a solvent in which it is substantially insoluble, e. g. petroleum ether. A further yield can be obtained by evaporation of the solvent and recovery of the product dissolved thereby. The product will be purified as described above.

Where a non-alcohol, hydrogenated abietyl derivative, as for example, a hydrogenated abietyl halide, is employed, the sulphonating agent will desirably be a sulphite or acid sulphite, as, for example, sodium sulphite, sodium acid sulphite, etc. The hydrogenated abietyl halide dissolved in a suitable solvent, as, for example, benzene, xylene, petroleum hydrocarbons, ether, etc. will be treated directly with the sulphite at a suitable temperature, as, for example, from about 10° C. to about 275° C. The use of a neutral sulphite will produce directly the corresponding salt of the sulphonated hydrogenated abietyl derivative, while an acid sulphite will produce the usual acidic sulphonation product which will be neutralized during its purification. If a hydrocarbon solvent is employed, the sulphonation product will separate and can be easily removed. If a solvent in which it is soluble, e. g. ether, is used, the product may be readily obtained by evaporation of the ether solution after its separation from the insoluble salt formed in the reaction.

The procedure in accordance with this invention for the production of sulphonated hydrogenated abietyl derivatives is illustrated in its more specific embodiments by the examples given below:

*Example I*

290 g. hydrogenated abietyl alcohol are mixed with 120 g. acetic anhydride; to the mixture are slowly added 300 g. concentrated $H_2SO_4$ with cooling and vigorous agitation. The temperature is held at about 10° C. while introducing the acid. After the acid has been introduced, the agitation is continued at room temperature from 5 to 20 hours until complete water solubility results. 250 cc. water are then added with cooling and agitation, and the mixture allowed to stand. The sulphonated material separates and is washed with 500 cc. of 12% NaCl solution, then dissolved in 200–300 cc. water and neutralized with 5% NaOH. 300 cc. saturated salt solution are added with agitation. The sodium salt of sulphonated hydrogenated abietyl alcohol separates as a brown-colored solid containing 6–12% sulphur, possessing emulsifying, wetting and detergent properties.

The above procedure may be varied in some cases depending upon the type product desired. For example: The alcohol may be added to the sulphonating mixture. The temperature may be raised, if it is desired to speed up reaction. The amount of sulphonating acid and acetic anhydride used may also be varied depending upon the degree of sulphonation desired. Other alkalies and bases, as pyridine, etc., may be used in neutralization, and the concentration of the base used, whether inorganic or organic, may be widely varied, for example, from 1 to 20%. The amount and concentration of salt solution used in the washing may likewise be widely varied.

*Example II*

290 g. hydrogenated abietyl alcohol are dissolved in 600 g. petroleum ether, and 116 g. chlorsulphonic acid are added very slowly with vigorous agitation while keeping the temperature at 5–10° C. If the acid is added slowly the sulphonated material formed separates immediately from the solvent. After all the acid is added, the solvent is filtered from the sulphonated material. Additional product remaining in the solvent may be removed by evaporating the petroleum ether. The product is purified as in Example I.

The amount of solvent used may be widely varied. Also the temperature may vary widely, as for example, from 0° to 50° C. The amount of acid used, relative to the alcohol, may vary widely, as for example, from the ratio of 0.2:1 to 5:1. Other suitable saturated hydrocarbons such as hexane, octane, etc. may be used as solvents.

*Example III*

290 g. hydrogenated abietyl alcohol are dissolved in 290 g. hexane. 300 g. concentrated $H_2SO_4$ are added slowly with vigorous agitation while keeping the temperature at 10° C. to 20° C. After the acid is added, the mixture is agitated for 7–20 hours until complete sulphonation is effected. Three phases will then be present: (a) an upper phase consisting of hexane and some sulphonated material emulsified therein, and (b) and (c), the lower two phases comprising excess $H_2SO_4$ and the solid sulphonic acids insoluble in both hexane and $H_2SO_4$. Phase (a) is separated, and the solvent evaporated, leaving a small amount of sulphonic acids and some unsulphonated material. To phases (b) and (c) are added 200–250 cc. water with cooling and agitation. The sulphonated material, which is insoluble in 40–50% acid, separates and is combined with that obtained from phase (a). The product is then washed and neutralized as in Example I to effect purification.

The amounts of reactants and solvent, and the temperature may vary widely as in the other examples.

*Example IV*

290 g. hydrogenated abietyl alcohol are slowly added to 500 g. concentrated $H_2SO_4$ at 5–10° C. with vigorous agitation. After the alcohol is added, the mixture is agitated from 10–20 hours at room temperature, until substantially complete solubility in water results. 500 g. water is then added with agitation and cooling. The sulphonated material separates and is washed and neutralized as in Example I. The ratio of alcohol to acid used may vary from 1:0.3 to 1:20 depending upon the type of product. By increasing the temperature, the reaction rate may be increased, at the expense of a light color however.

*Example V*

353 g. hydrogenated abietyl bromide are dissolved in 350 g. octane; 126 g. anhydrous sodium sulphite is added. The mixture is refluxed for 8 hours with vigorous agitation. The solid material is separated from the solvent and extracted with warm butyl alcohol. The sodium hydrogenated abietyl sulphonate is recovered by evaporation of the butyl alcohol, while the sodium bromide formed is left undissolved by this solvent.

The procedure may be modified by heating the reactants together at, for example, 70–170° C. for 8 hours and then either extracting the solid material formed as before, or dissolving the entire mixture in 300 cc. water and salting out the sodium sulphonate with NaCl, or the like. Other non-reactive solvents, such as benzene, xylene, terpineol, dipentene, pine oil, etc., are suitable as reaction media. When pine oil is used the sulphonated material remains in the pine oil, while the NaBr separates and may be removed by filtration. The pine oil mixture may then be used as an emulsive, dispersing, or wetting-out agent without further separation of sulphonated material. Various alcohols, esters and ethers may be used as extraction solvents in place of butyl alcohol, and the reaction may be carried out, if desired, in such extraction solvents. Other sulphites may be used in equivalent amounts.

Hydrogenated abietyl chloride may be substituted for the bromide in molecular proportions.

If desired the various hydrogenated abietyl derivatives may be sulphonated in accordance with this invention in admixture with various other materials capable of sulphonation, as for example, lauryl alcohol, stearlyl alcohol, oleic, stearic, linoleic acid, etc. The product in such cases will be a mixed sulphonation product of the materials used.

It will be appreciated that the method in accordance with this invention is not limited to any particular mode of procedure as shown in the various examples, which are illustrative only, but involves broadly only the treatment of a suitable hydrogenated abietyl derivative witth a sulphonating agent. As has been said, the proportions of reactants, the amounts, if any, of solvent used, the temperature and the time of reaction may be widely varied to produce a material having the properties desired for any particular use or purpose.

Throughout this specification and in the claims hereinafter set forth the following terms are used with the following meanings:

"Abietyl derivative" refers to and includes compounds of the type $C_{19}H_{29}CH_2X$, where X is a functional group. By the term "suitable hydrogenated abietyl derivative" is meant a hydrogenated abietyl derivative capable of reaction with a sulphonating agent to give a sulphonated product.

"Sulphonate", and its grammatically related forms, refer to and include the process of sulphonating and sulphating and/or the respective sulphonates and sulphates so formed or mixtures thereof.

What I claim and desire to protect by Letters Patent is:

1. The sulphonation product of a hydrogenated abietyl halide.

2. The method of producing a sulphonated hydrogenated abietyl derivative which includes reacting a hydrogenated abietyl halide and a sulphonating agent.

3. The method of producing a sulphonated hydrogenated abietyl derivative which includes reacting a hydrogenated abietyl halide and a sulphite.

4. The method of producing a sulphonated hydrogenated abietyl derivative which includes reacting a hydrogenated abietyl halide in solution in an inert solvent and a sulphonating agent.

5. The method of producing a sulphonated hydrogenated abietyl derivative which includes reacting a hydrogenated abietyl halide and sodium sulphite.

6. The method of producing a sulphonated hydrogenated abietyl derivative which includes reacting a hydrogenated abietyl bromide and a sulphonating agent.

7. The method of producing a sulphonated hydrogenated abietyl derivative which includes reacting a hydrogenated abietyl chloride and a sulphonating agent.

8. The method of producing a sulphonated hydrogenated abietyl derivative which includes reacting a hydrogenated abietyl halide and a sulphonating agent and extracting the reaction product with an inert solvent.

9. The sulphonation product of hydrogenated abietyl bromide.

10. The sulphonation product of hydrogenated abietyl chloride.

11. A sulphonated derivative of hydroabietyl alcohol having the formula $Ab-CH_2-SO_3-X$ in which Ab is the hydrocarbon nucleus of hydroabietic acid and X is a material selected from the group consisting of hydrogen, alkali metals and ammonium.

12. A sulphonated derivative of hydroabietyl alcohol having the formula $Ab-CH_2-SO_3-X$ in which Ab is the hydrocarbon nucleus of dihydroabietic acid and X is a material selected from the group consisting of hydrogen, alkali metals and ammonium.

13. A sulphonated derivative of hydroabietyl alcohol having the formula $Ab-CH_2-SO_3-X$ in which Ab is the hydrocarbon nucleus of tetrahydroabietic acid and X is a material selected from the group consisting of hydrogen, alkali metals and ammonium.

14. A sulphonated derivative of hydroabietyl alcohol having the formula $Ab-CH_2-SO_3-X$ in which Ab is the hydrocarbon nucleus of hydroabietic acid and X is an alkali metal.

15. A sulphonated derivative of hydroabietyl alcohol having the formula $Ab-CH_2-SO_3-X$ in which Ab is the hydrocarbon nucleus of dihydroabietic acid and X is an alkali metal.

16. A sulphonated derivative of hydroabietyl alcohol having the formula $Ab-CH_2-SO_3-X$ in which Ab is the hydrocarbon nucleus of tetrahyroabietic acid and X is an alkali metal.

17. A sulphonated derivative of hydroabietyl alcohol having the formula $Ab-CH_2-SO_3-Na$ in which Ab is the hydrocarbon nucleus of hydroabietic acid.

18. A sulphonated derivative of hydroabietyl alcohol having the formula $Ab-CH_2-SO_3-Na$ in which Ab is the hydrocarbon nucleus of dihydroabietic acid.

19. A sulphonated derivative of hydroabietyl alcohol having the formula $Ab-CH_2-SO_3-Na$ in which Ab is the hydrocarbon nucleus of tetrahydroabietic acid.

ALFRED L. RUMMELSBURG.